Dec. 21, 1954 R. B. TROUSDALE 2,697,781
AUTOMATIC RING STARTING CIRCUIT
Filed June 5, 1950
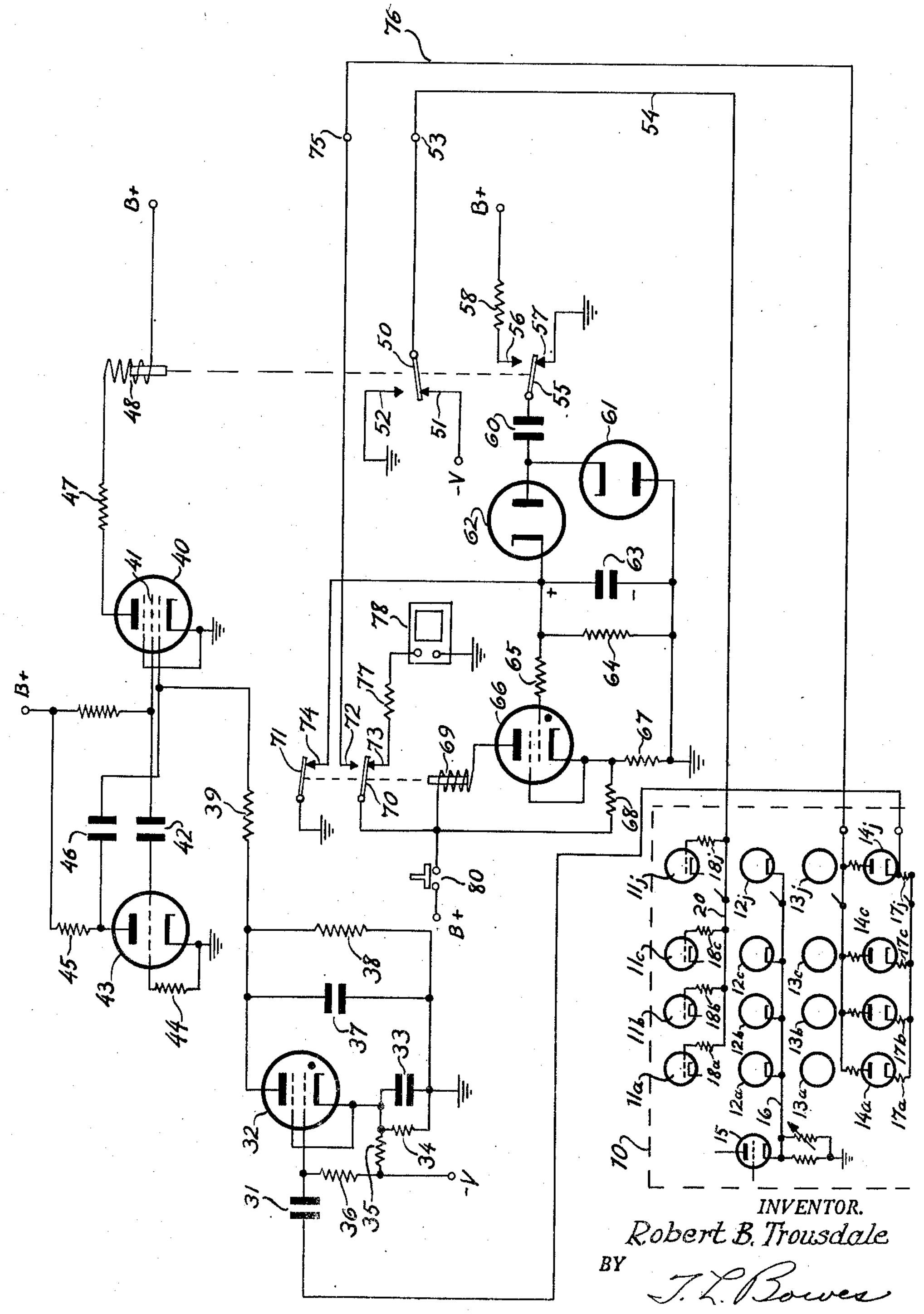
INVENTOR.
Robert B. Trousdale
BY T. L. Bowes
Att'y United States Patent Office 2,697,781

Patented Dec. 21, 1954

2,697,781

AUTOMATIC RING STARTING CIRCUIT

Robert B. Trousdale, Rochester, N. Y., assignor to Stromberg-Carlson Company, a corporation of New York Application June 5, 1950, Serial No. 166,234

17 Claims. (Cl. 250—27)

The present invention relates to an automatic starting circuit, and, more particularly, to a starting circuit for automatically starting a pulse commutating ring counter circuit of the improved form disclosed and claimed in co-pending application Serial No. 156,399, Robert B. Trousdale, filed April 17, 1950, now Patent No. 2,617,931, granted November 11, 1952 and assigned to the same assignee as the present invention.

Briefly, the pulse commutating ring counter circuit described in the above application comprises an endless series of switching circuits which are sequentially operated in response to suitable driving pulses to commutate pulses successively to a plurality of different output circuits. Such ring circuits find application in many types of systems. For example, such a ring circuit may be utilized in an electronic telephone system of the improved form disclosed and claimed in co-pending application Serial No. 134,974, Frank A. Morris and Robert B. Trousdale, filed December 24, 1949, and assigned to the same assignee as the present invention, wherein a system of multiplexing, namely, pulse sampling effectively at an ultrasonic rate of the control and intelligence signals produced at each substation of the system, is used to provide a signal channel separation. In such a telephone system a decimal system of multiplexing is employed which entails arbitrary division of the lines of the system into subgroups. The pulse commutating ring circuits employed in such a system commutate output pulses to a plurality of selector circuits during the particular time intervals assigned thereto so as to accomplish the desired signal channel separation. In ring circuits of this type, wherein a plurality of electronic switching circuits are interconnected in an endless series, it has been found in practice that considerable difficulty is experienced in starting and maintaining the ring circuit in proper sequential operation. Such difficulty is due in part to the common cathode impedance connected to all of the switching circuits which tends to produce degenerative feedback effects and in part to the connections between the switching circuits by virtue of which one circuit is turned off as the succeeding circuit is turned on.

While application, Serial No. 156,399 referred to above discloses a starting arrangement for initiating the operation of the ring circuit by means of a push button starting switch, such an arrangement is necessarily limited to manually operated systems and in a fully automatic system of the character disclosed in application Serial No. 134,974, it is necessary to provide automatic means for starting the ring circuit, and, in the event of failure to start the ring circuit, to provide an alarm signal whereby an indication is given that a particular ring circuit, or circuits, in the automatic telephone system is inoperative.

Accordingly, it is an important object of the present invention to provide a new and improved automatic starting circuit which is suitable for use with a pulse commutating ring counter circuit.

It is a further object of the present invention to provide a new and improved automatic ring starting circuit wherein means are provided for automatically conditioning the ring circuit for starting thereof and after a predetermined number of unsuccessful starting attempts the ring circuit is locked up in a disabled condition.

It is another object of the present invention to provide a new and improved automatic ring starting circuit in which a starting voltage is repeatedly applied and removed to the ring circuit to promote starting thereof and after a predetermined number of unsuccessful applications of the starting voltage to the ring circuit, the ring circuit is permanently disabled, and an alarm signal is initiated.

The invention, both as to its organization and method of operation, together with further objects and advantages thereof, will best be understood by reference to the following specification taken in connection with the accompanying drawing, in which the single figure shows a schematic diagram of an automatic ring starting circuit embodying the principles of the present invention.

Referring now more particularly to the drawing, the automatic ring starting circuit of the present invention is illustrated in connection with a pulse commutating ring counter circuit which is indicated generally at 10. The pulse commutating ring circuit 10 is described in detail in the co-pending applications, Serial No. 156,399 and Serial No. 134,974, and reference may be had thereto for a detailed description thereof. However, for purposes of the present disclosure it may be stated that the ring circuit comprises a series of ten pulse-forming and gating stages of which the first three and tenth stages are illustrated in the drawing. Each pulse forming and gating stage comprises four tubes which, for convenience of explanation, have been arranged in vertical alignment. Thus, the first pulse forming and gating stage comprises the vertically aligned tubes 11*a*, 12*a*, 13*a* and 14*a*. The tubes 11*a* and 12*a* are interconnected to form an electronic switching circuit which is actuated by driving pulses supplied through a cathode follower 15 to a common ring driving pulse conductor 16 which is connected to the cathodes of all of the devices 12*a*–12*j*. The control electrodes of the devices 11*a*–11*j* are connected through the resistors 18*a*–18*j* to a common bias voltage conductor 20. Pulses which are produced by the switching circuits 11*a* and 12*a* are supplied through the phase inverting and amplifying device 13*a* to an output amplifier 14*a* and appear across the cathode load impedance 17*a* thereof. There is thus produced across the output impedances 17*a*–17*j* commutated output pulses in successive time positions as determined by the interconnections of the endless series of switching circuits. The output pulses appearing across the loads 17*a*–17*j* are non-overlapping and, as indicated above, occur successively within repetitive time position frames in which the duration of each such frame is determined by the time required for one complete cycle of operation of the ring circuit.

In order to provide a control voltage which indicates whether or not the ring circuit 10 is operating properly, there is derived from one of the commutated output circuits, for example, the output circuit including the resistor 17*j*, control pulses which are only present if the ring circuit is operative to supply pulses to that particular pulse forming and gating stage in the above-described commutating sequence. Thus, if the ring circuit 10 comprises ten stages, one control pulse is developed at the cathode of the tube 14*j* during each operating cycle of the circuit, this pulse being produced during the interval when the tenth stage of the ring circuit is active. These control pulses are indicative of the continued operation of the ring circuit and are supplied to the automatic ring starting circuit of the present invention. Specifically, the pulses from the resistor 17*j* are supplied through a capacitor 31 to the control electrode of a gaseous discharge tube 32. The cathode of the tube 32 is connected through a parallel impedance combination of a capacitor 33 and a resistor 34 to ground, and is also connected through a resistor 35 to a negative source of bias potential indicated by the reference character —V. A grid leak resistor 36 is connected from the control electrode of the tube 32 to the negative source of potential. The anode of the tube 32 is connected through a capacitor 37 to ground and a resistor 38 is connected across the capacitor 37.

A control voltage, which is derived from the anode of the tube 32 is connected through the resistor 39 to the control electrode of an electron discharge tube 40. The screen electrode 41 of the tube 40 is coupled through a capacitor 42 to the control electrode of an electron discharge tube 43. The control electrode of the tube 43 is also connected through a resistor 44 to ground. The anode of the tube 43 is connected through a resistor 45 to the B+ supply and is also connected through a capacitor 46 to the control electrode of the tube 40. The anode of the tube 40 is connected through a limiting resistor 47 and the winding of a relay 48 to the B+ supply.

Referring now to the operation of the above-described timing circuit portion of the automatic ring starting circuit of the present invention, positive control pulses are supplied from the ring circuit 10 during the continued operation thereof and are impressed upon the control electrode of the timing tube 32 through the capacitor 31. These positive control pulses effect the ionization of the tube 32 and, when the tube 32 is conducting, there is a constant voltage drop thereacross, the remainder of the negative supply voltage appearing across the resistors 35 and 38. When the tube 32 is conducting the capacitor 37 is charged in the negative direction so that the anode of the tube 32 is placed at a relatively large negative potential with respect to ground. At the same time, resistor 38 does not provide sufficient space current to maintain ionization of tube 32, with the result that tube 32 extinguishes, in the same manner as a relaxation oscillator. When sufficient charge is reacquired by the capacitor 33, the tube 32 is again fired by the next positive pulse supplied to the control electrode thereof through the capacitor 31 during the next operating cycle of the ring circuit 10. Thus, as long as positive control pulses are supplied to the tube 32 by the ring circuit 10, the tube will be fired periodically and the capacitor 37 will remain charged to maintain the anode of the device 32 highly negative with respect to ground. The resistor 38, which is connected across the capacitor 37 operates to discharge this capacitor during the off-pulse periods. However, the value of the resistor 38 is made large enough to prevent substantial discharge of the capacitor 37 during that interval of each off-pulse period when the device 32 is extinguished.

When the positive control pulses cease, which occurs when the ring circuit fails to operate properly, the device 32 remains non-conductive and hence the capacitor 37 is permitted to discharge through the resistor 38 so that the potential at the anode of the device 32 becomes decreasingly negative. As a consequence, the bias potential on the control electrode of the device 40 is correspondingly decreased to permit space current conduction therethrough.

As described above, the devices 40 and 43 are interconnected to form a multivibrator having a very low operating frequency. Thus, the screen electrode of the device 40 is coupled through the capacitor 42 to the control electrode of the device 43 and the anode of the device 43 is coupled through the capacitor 46 to the control electrode of the device 40. Under normal conditions, when the ring circuit 10 is operating and the anode voltage of the device 32 has a relatively large negative value, the control electrode of the device 40 is biased sufficiently negative so that the multivibrator circuit thus formed is wholly inoperative. However, upon cessation of the control pulses from the ring circuit 10 to produce the above-described decrease in the negative potential at the anode of the device 32, the control electrode of the device 40 becomes biased so that the multivibrator starts to operate. Operation of this circuit is entirely conventional and will be readily apparent to those skilled in the art.

When the multivibrator is thus placed in operation, square wave anode current pulses are caused to flow through the device 40 and the winding of the relay 48 at a repetition rate determined by the time constants of the multivibrator circuit. Thus, the relay 48 operates alternately to open and close its contacts at the low frequency rate of the multivibrator.

The relay 48 is provided with a first movable contact 50 movable between fixed contacts 51 and 52 which are respectively connected to ground and a negative potential source. The movable contact 50 is connected to the output terminal 53 of the automatic starting circuit of the present invention and through the conductor 54 to the bias voltage conductor 20 of the ring circuit 10. The relay 48 also includes a second contact 55 movable between fixed contacts 56 and 57, which are respectively connected through a resistor 58 to the positive source of potential B+ and to ground.

When the above-described multivibrator supplies current-pulses to the relay 48, the movable contacts 50 and 55 are obviously moved back and forth between their associated fixed contacts. When the contact 50 is moved between the contact 51 and 52, it operates repeatedly to remove and reapply bias voltage to the bias voltage conductor 20 of the ring circuit 10. Each time this bias voltage is removed from and reapplied to the conductor 20, a starting impulse is supplied to the ring circuit 10 which should result in this circuit starting to operate. Also, when the movable contact 55 is moved back and forth between its associated contacts 56 and 57 the contact 55 is repeatedly connected first to the B+ supply and then to ground. From the foregoing explanation it will be evident that the capacitor 37 is charged and discharged as described above to provide a control voltage which has a first value so long as the ring circuit is operating properly and is discharged to a second low potential value when operation of the ring circuit stops. The control voltage produced across the capacitor 37 is utilized to unblock the multivibrator including the devices 40 and 43 when control pulses from the ring circuit 10 have ceased so that bias voltage is repeatedly removed from and reapplied to the bias voltage conductor of the ring circuit to promote starting thereof.

If the repeated application of operating potential to the ring circuit 10 is successful in starting that circuit, control pulses are again supplied from the output stage of **14*j* of the ring circuit to the timing tube 32 so as to charge the capacitor 37 negatively and block the multivibrator. In this connection, it will be understood that the cyclic repetition rate of the ring circuit 10, or, in other words, the repetition rate of the control pulses supplied to the tube 32, must be many times greater than the frequency of the multivibrator. This is readily apparent when it is realized that the multivibrator must be sufficiently slow in its operation to maintain bias voltage supplied to the ring circuit 10 over the conductor 54 for a long enough period to permit the ring circuit to reinitiate its operation and supply enough control pulses to the tube 32 to charge the capacitor 37** by an amount sufficient to block the multivibrator.

In the event that the repeated removal and reapplication of bias voltage from and to the bias voltage conductor 20 of the ring circuit does not result in the resumption of operation of the ring circuit 10 such that the ring circuit remains inoperative, means are provided in the system for permanently locking out the ring circuit and initiating an alarm indicative of the defective condition of the ring circuit after a predetermined number of unsuccessful attempts to start the ring circuit. More specifically, a counter circuit is provided which counts the number of times the bias voltage is removed and reapplied to the ring counter circuit 20, and, after a predetermined number of such applications, the anode voltage for the output tubes **14*a*–14*j* of the ring circuit is removed, thus permanently disabling the ring circuit 10**.

To provide such a counter circuit and associated control equipment, the movable contact 55 of the relay 48, is connected through a capacitor 60 and a first diode rectifier device 61 to ground. The capacitor 60 is further connected through an oppositely poled diode rectifier tube 62 and a capacitor 63 to ground. A resistor 64 is connected across the capacitor 63, and the cathode of the tube 62 is connected through a resistor 65 to the control electrode of a gaseous discharge tube 66. The cathode of the tube 66 is connected through a resistor 67 to ground potential and through a resistor 68 to the B+ supply, whereas the anode of the device 66 is connected through the winding of a relay 69 to the B+ supply source. The relay 69 is provided with movable contacts 70 and 71, the first of which is movable between fixed contacts 72 and 73 and the second of which is associated with the fixed contact 74. The fixed contact 72 is connected through the output terminal 75 of the starting circuit and through the lead 76 to supply anode voltage to the output stages **14*a*–14*j* of the ring circuit 10. The fixed contact 73 is connected through the resistor 77 to a suitable alarm signal such as the buzzer indicated generally at 78. The movable contact 70 is connected to the B+ supply and the movable contact 71** is connected to ground.

Considering now the operation of the above-described counter circuit to count a predetermined number of operating cycles of the relay contact 55 and then permanently disable the ring circuit 10, it is evident that the movable contact 55 is alternately connected to the B+ supply through the contact 56 and the resistor 58 and to ground through the contact 57. During periods when the contact 55 is connected to the B+ supply, the rectifier 62 is conductive and the capacitors 60 and 63 are charged in series so that there is produced a voltage across the capacitor 63 of the polarity indicated in the drawing. When the movable contact 55 is connected to ground, the rectifier 62 is rendered non-conductive due to the fact that the anode is driven negatively with respect to the cathode thereof. However, the rectifier 61 conducts and operates to discharge the capacitor 60, so that the capacitor 60 is discharged although the capacitor 63 holds its charge. The voltage across the capacitor is thus increased in stair-step fashion to a potential at which the gaseous discharge tube 66 is fired. Once this tube is fired, the control grid thereof loses control, so that it continues to conduct to hold the relay 69 operated after the condenser 63 is discharged. If desired, a manually operable switch 80 may be employed to open the supply circuit to the relay 69 and tube 66, thereby to release the relay and de-ionize the tube and thus reset the counter and alarm circuit for further operation. When the device 66 conducts, the relay 69 is energized to close its contacts 70 and 73, and 71 and 74. With the relay 69 energized, B+ potential is supplied to the buzzer circuit 78 and is removed from the contact 72 and hence from the output stages of the ring circuit 10. When the contacts 71 and 74 are closed the capacitor 63 is short-circuited and discharged to prepare it for the next cycle.

The resistor 64, which is connected across the capacitor 63, has a relatively high resistance value so that the capacitor 63 discharges therethrough at a relatively slow rate. Hence, if the ring circuit 10 starts and control pulses reappear at the cathode of the tube **14*j* after a few applications of bias voltages to the ring circuit, the disabling device 66 is not energized, but instead the charge across the capacitor 63 is dissipated through the resistor 64** and the ring circuit remains in operation.

To summarize the operation of the above-described automatic ring starting circuit and assuming that the ring circuit 10 is operating satisfactorily so as to provide control pulses across the output resistor **17*j* thereof, it is evident that the tube 32 is periodically rendered conductive by the control pulses from the ring circuit 10 so as to maintain the capacitor 37 in a substantially fully charged condition and the anode voltage of the tube 32 at a relatively high negative potential. With the anode of the tube 32 highly negative, the multivibrator, including the tubes 40 and 43, is blocked so that it cannot operate and the relay 48** remains in its released position.

When control pulses cease to be produced by the ring circuit 10, however, the tube 32 remains non-conductive and the capacitor 37 discharges through the resistor 38 associated therewith so that the anode potential of the device 32 becomes less negative. As the anode potential of the device 32 becomes less negative, the multivibrator is unblocked and the movable contacts 50 and 55 are moved back and forth between the associated fixed contacts at a relatively slow rate which is dependent upon the free running frequency of the multivibrator 40. As the contact 50 is moved back and forth between the contacts 50 and 51, the negative bias potential −V is repeatedly removed and reapplied to the bias voltage conductor 20 of the ring circuit so as to promote starting thereof. If the successive reapplication of bias voltage to the ring circuit is successful in starting the same, the device 32 again is rendered periodically conductive so as to charge the capacitor 37 negatively, thus causing the multivibrator to become inoperative. In this connection, it will be noted that the multivibrator is always blocked in a particular direction, i. e., the device 40 is always rendered non-conductive so that the relay coil 48 is always deenergized and the contact 50 is normally in the position shown in the drawing with the multivibrator inoperative. Thus, the multivibrator is always deenergized in the correct direction to maintain the application of negative bias voltage through the contacts 50 and 51 to the bias voltage conductor 20 of the ring circuit.

In the event that successive reapplications of bias voltage to the ring circuit is ineffective to start the ring circuit, the counter circuit storage capacitor 63 is eventually charged to a sufficiently large positive potential to cause conduction of the device 66. In this connection it will be understood that the voltage divider network including the resistors 67 and 68 may be so chosen that the cathode potential is sufficiently positive to require a predetermined number of reapplications of bias voltage, i. e., a predetermined number of cycles of the multivibrator, before the device 66 conducts. When the device 66 conducts, B+ potential, which was previously supplied through the closed contacts 70 and 72 to the output stages **14*a*–14*j* of the ring circuit, is removed and B+ supply voltage is instead applied to the buzzer circuit 78** so as to initiate an alarm signal.

By way of example, and not in any sense as a limitation to the particular values given, an automatic ring starting circuit constructed in accordance with the present invention has been found satisfactory to provide automatic starting for a pulse commutating ring counter circuit of the type described in the copending application, Serial No. 156,399, referred to above. In the specific embodiment developed for this purpose, the gaseous discharge devices 32 and 66 are of the commercial type 5696, the device 43 is a commercial type 6C4, the device 40 is a commercial type 6AK6, and the devices 61 and 62 comprise a double diode commercial type 6AL5. Other circuit constants employed are as follows:

| | | |
|---|---|---|
| Resistor **34** | ohms | 220,000 |
| Resistor **35** | do | 10,000 |
| Resistor **36** | megohms | 1 |
| Resistor **38** | do | 1 |
| Resistor **39** | do | 4.7 |
| Resistor **44** | do | 1 |
| Resistor **47** | ohms | 1,000 |
| Resistor **58** | do | 1,000 |
| Resistor **64** | megohms | 4.7 |
| Resistor **65** | ohms | 470,000 |
| Resistor **67** | do | 6,000 |
| Resistor **68** | do | 33,000 |
| Resistor **77** | do | 1,000 |
| Capacitor **31** | mfd | .01 |
| Capacitor **33** | mfd | .01 |
| Capacitor **37** | mfd | .01 |
| Capacitor **42** | mfd | .05 |
| Capacitor **46** | mfd | .05 |
| Capacitor **60** | mfd | .01 |
| Capacitor **63** | mfd | 4.0 |

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. In combination, a pulse commutating ring circuit, a timing circuit, means for supplying pulses from said ring circuit to said timing circuit when said ring circuit is operating properly, means for deriving a control voltage from said timing circuit having a first value when said ring circuit is operating and having a second value when said ring circuit is stopped, means operative when said control voltage has said second value for repeatedly energizing and deenergizing said ring circuit to promote starting thereof, and means for permanently disabling said ring circuit after a predetermined number of successive unsuccessful energizations of said ring circuit.

2. In combination, a pulse commutating ring circuit, a timing circuit, means for supplying pulses from said ring circuit to said timing circuit when said ring circuit is operating properly, means for deriving a control voltage from said timing circuit having a first value when said ring circuit is operating and having a second value when said ring circuit is stopped, means operative when said control voltage has said second value for repeatedly energizing and deenergizing said ring circuit to promote starting thereof, and means responsive to a predetermined number of successive unsuccessful energizations of said ring circuit for initiating an alarm signal indicative of the defective condition of the ring circuit.

3. In combination, a pulse commutating ring circuit, a timing circuit, means for supplying pulses from said ring circuit to said timing circuit when said ring circuit is operating properly, means for deriving a control voltage from said timing circuit having a first value when said ring circuit is operating and having a second value when said ring circuit is stopped, means operative when said control voltage has said second value for repeatedly energizing and deenergizing said ring circuit to promote starting thereof, and means responsive to a predetermined number of successive unsuccessful energizations of said ring circuit for simultaneously initiating an alarm signal and permanently disabling said ring circuit.

4. An automatic starting circuit for a pulse commutating ring circuit of the type employing an endless series of tubes which are sequentially switched in accordance with a series of driving pulses, comprising a capacitor, means controlled by output pulses from said ring circuit for periodically charging said capacitor, means for discharging said capacitor to a predetermined reference level in the absence of said output pulses, means operative when the voltage across said capacitor reaches said predetermined reference level for repeatedly removing and reapplying bias voltage to said ring circuit, and means responsive to a predetermined number of successive unsuccessful applications of bias voltage for permanently disabling said ring circuit.

5. An automatic starting circuit for a pulse commutating ring circuit, comprising a capacitor, means for deriving pulses from said ring circuit indicative of the continued operation thereof, means for charging said capacitor during said derived pulses, and means for discharging said capacitor to a predetermined reference level in the absence of said derived pulses, means operative when the voltage across said capacitor reaches said predetermined reference level for repeatedly removing and reapplying bias voltage to said ring counter circuit, and means responsive to a predetermined number of successive applications of bias voltage to said ring circuit for permanently disabling said circuit.

6. An automatic starting circuit for a ring circuit, comprising means for deriving pulses from said ring circuit indicative of the continued operation thereof, a capacitor, means for charging said capacitor in response to said derived pulses, means for discharging said capacitor in the absence of said derived pulses, a low frequency oscillator, means for enabling said oscillator when the voltage across said capacitor reaches said predetermined voltage level, relay means controlled by said oscillator for repeatedly removing and reapplying bias voltage to said ring circuit to promote starting thereof, and counter circuit means controlled by said relay means for permanently disabling said ring circuit after a predetermined number of successive unsuccessful applications of bias voltage to said ring circuit.

7. An automatic starting circuit for a ring circuit, comprising means for deriving pulses from said ring circuit indicative of the continued operation thereof, a capacitor, means for charging said capacitor in a predetermined direction in response to said derived pulses, means for discharging said capacitor in the absence of said derived pulses, an oscillator having an operating frequency many times smaller than the frequency of said pulses, means for enabling said oscillator when said capacitor is discharged to said predetermined voltage level, relay means controlled by said oscillator for repeatedly removing and reapplying bias voltage to said ring circuit to promote starting thereof, counter circuit means controlled by said relay means for permanently disabling said ring circuit after a predetermined number of successive unsuccessful applications of bias voltage to said ring circuit, and means for initiating an alarm signal simultaneously with disabling of said ring circuit.

8. In combination, a pulse commutating ring circuit including a plurality of electronic switching circuits, means connecting said circuits in an endless series, an impedance common to all of said circuits and included in the space current path of each of said circuits, a source of driving pulses, means connecting said source and said impedance thereby to actuate said switching circuits in predetermined sequence in accordance with said driving pulses, means for deriving output pulses from each of said switching circuits in accordance with successive actuations thereof, said common impedance having a value large enough to prevent multiple actuation of said switching circuits while permitting actuation of a single one of said circuits in response to said driving pulses, and means responsive to cessation of the operation of said ring circuit for removing and reapplying a bias voltage to said switching circuits to facilitate restarting of said ring circuit.

9. In combination, a pulse commutating ring circuit including a plurality of electronic switching circuits, means connecting said circuits in an endless series, an impedance common to all of said circuits and included in the space current path of each of said circuits, a source of driving pulses, means connecting said source and said impedance thereby to actuate said switching circuits in predetermined sequence in accordance with said driving pulses, means for deriving output pulses from each of said switching circuits in accordance with successive actuations thereof, said common impedance having a value large enough to prevent multiple actuation of said switching circuits while permitting actuation of a single one of said circuits in response to said driving pulses, means for deriving from one of said switching circuits a control signal indicative of a cessation of operation of said ring circuit, and means responsive to said control signal for removing and reapplying a bias voltage to all of said switching circuits in parallel to permit starting of said ring circuit.

10. In combination, a pulse commutating ring circuit including a plurality of electronic switching circuits, means connecting said circuits in an endless series, an impedance common to all of said circuits and included in the space current path of each of said circuits, a source of driving pulses, means connecting said source and said impedance thereby to actuate said switching circuits in predetermined sequence in accordance with said driving pulses, means for deriving output pulses from each of said switching circuits in accordance with successive actuations thereof, said common impedance having a value large enough to prevent multiple actuation of said switching circuits while permitting actuation of a single one of said circuits in response to said driving pulses, means for deriving from one of said switching circuits a control signal indicative of a cessation of operation of said ring circuit, means responsive to said control signal for removing and reapplying a bias voltage to all of said switching circuits in parallel to permit starting of said ring circuit, and means for permanently disabling said ring circuit by removing operating anode potential therefrom after a predetermined number of successive unsuccessful attempts to start said ring circuit.

11. In combination, a plurality of load impedances, a pulse commutating ring circuit for sequentially developing output pulses across said load impedances which occur in successive time positions within repetitive time position frames, means responsive to cessation of output pulses across one of said load impedances for developing a control signal, and means controlled by said control signal for removing and reapplying an operating potential to said ring circuit to facilitate redevelopment of output pulses across said one load impedance.

12. In combination, a plurality of load impedances, a pulse commutating ring circuit for sequentially developing output pulses across said load impedances which occur in successive time positions within repetitive time position frames, means responsive to cessation of output pulses across one of said load impedances for developing a control signal, means controlled by said control signal for repeatedly energizing and deenergizing said ring circuit to reinitiate development of output pulses across said one load impedance, and means for terminating development of output pulses across each of said load impedances after a number of successive energizations of said ring circuit without reinitiation of output pulses across said one load impedance.

13. In combination, a plurality of load impedances, a pulse commutating ring circuit for sequentially developing output pulses across said load impedances which occur in successive time positions within repetitive time position frames, means responsive to cessation of output pulses across one of said load impedances for developing a control signal, and means controlled by said control signal for removing and reapplying an operating potential to said ring circuit to facilitate redevelopment of output pulses across said one load impedance, and means responsive to reapplication of said operating potential without reinitiation of output pulses across said one load impedance for initiating an alarm signal.

14. In combination, a pulse commutating ring circuit including a plurality of switching tubes, means connecting said tubes in an endless series, a source of driving pulses, a negative bias potential source connected to the control grids of said tubes in parallel, means controlled by said driving pulses for sequentially rendering said tubes conductive at the rate of one tube for each driving pulse, means for deriving output pulses from said tubes as said tubes are sequentially rendered conductive, and means responsive to cessation of output pulses from one of said tubes for changing the bias potential on said control grids in the positive direction to facilitate redevelopment of output pulses by said one tube.

15. In combination, a plurality of electronic switching stages, means connecting said stages in endless series, a source of driving pulses, means for connecting pulses from said source to all of said switching stages in parallel thereby to actuate said stages in predetermined sequence, means for deriving output pulses from said switching stages in accordance with successive actuations thereof, and means responsive to cessation of output pulses from one of said switching stages for disabling all of said switching stages.

16. In combination, a plurality of electronic switching stages, means connecting said stages in endless series, a source of driving pulses, means for connecting pulses from said source to all of said switching stages in parallel thereby to actuate said stages in predetermined sequence, a plurality of load impedances, means responsive to successive actuations of said switching stages for sequentially developing non-overlapping output pulses across said load impedances which occur in successive time positions within repetitive time position frames, means responsive to cessation of the output pulses developed across one of said load impedances for producing an alarm signal to indicate the absence of output pulses from said switching stages, and means for preventing actuation of said last named means until the expiration of a predetermined time interval after the cessation of said output pulses.

17. In combination, a plurality of electronic switching stages, means connecting said stages in endless series, a source of driving pulses, means for connecting pulses from said source to all of said switching stages in parallel thereby to actuate said stages in predetermined sequence, means for deriving output pulses from said switching stages in accordance with successive actuations thereof, and means responsive to cessation of output pulses from one of said switching stages for removing and reapplying a bias potential to all of said stages in parallel to facilitate response thereof to said driving pulses.

References Cited in the file of this patent

UNITED STATES PATENTS

| Number | Name | Date |
|---|---|---|
| 2,136,621 | King | Nov. 15, 1938 |
| 2,260,977 | Jones | Oct. 28, 1941 |
| 2,310,105 | Michel | Feb. 2, 1943 |
| 2,329,090 | Smith | Sept. 7, 1943 |
| 2,411,888 | Long | Dec. 3, 1946 |
| 2,454,845 | Sherman | Nov. 30, 1948 |
| 2,510,167 | Boothroyd | June 6, 1950 |
| 2,536,035 | Cleeton | Jan. 2, 1951 |
| 2,553,468 | Pelle | May 15, 1951 |
| 2,553,594 | Lichtman | May 22, 1951 |